Feb. 4, 1958 E. A. WAHL 2,821,823
MACHINE FOR APPLYING STOPPERS TO BOTTLES
Filed Dec. 22, 1952 11 Sheets-Sheet 1

Inventor
Eugene A. Wahl
BY
Gaylor, Cofield + Jurick
Attorneys

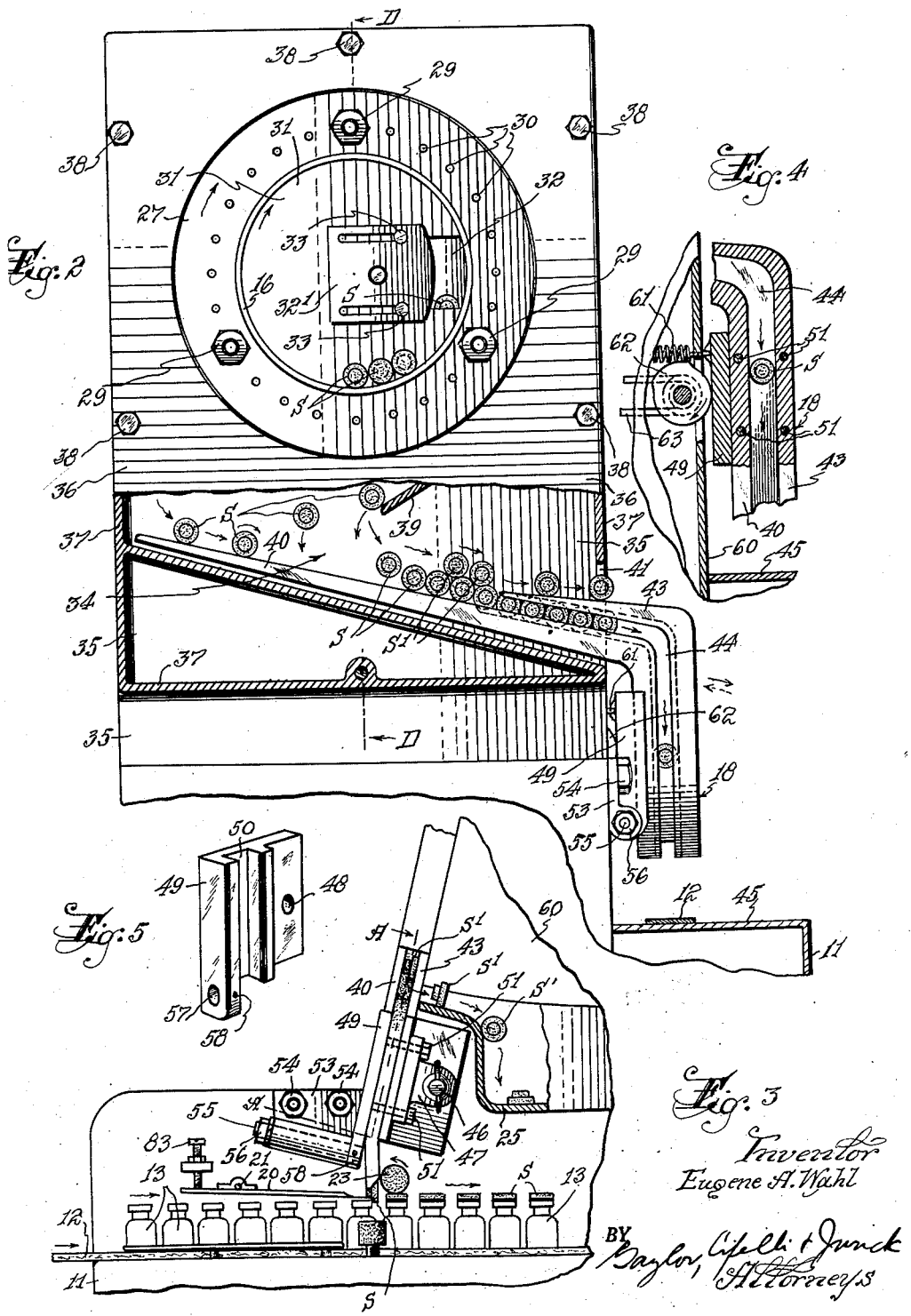

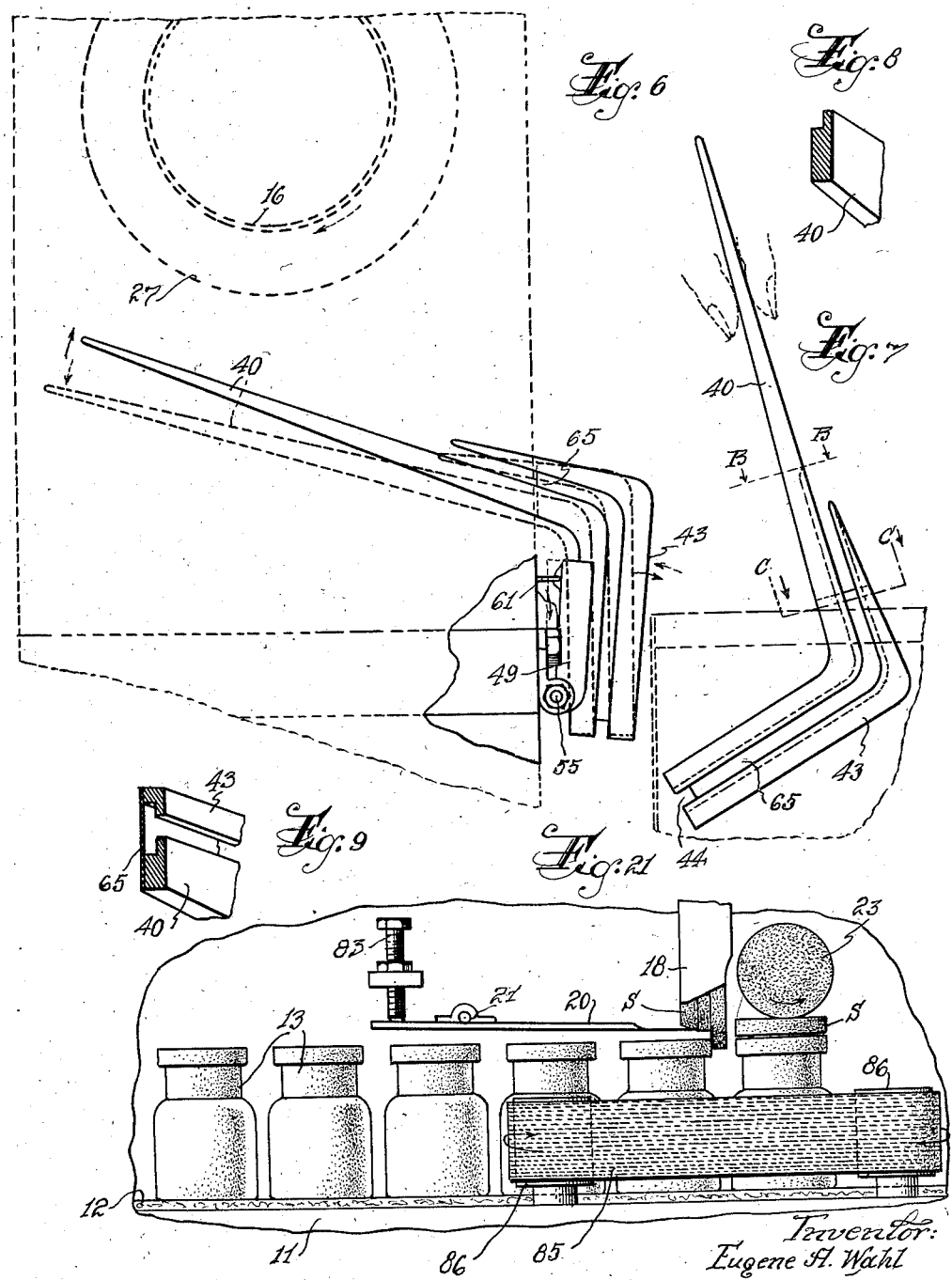

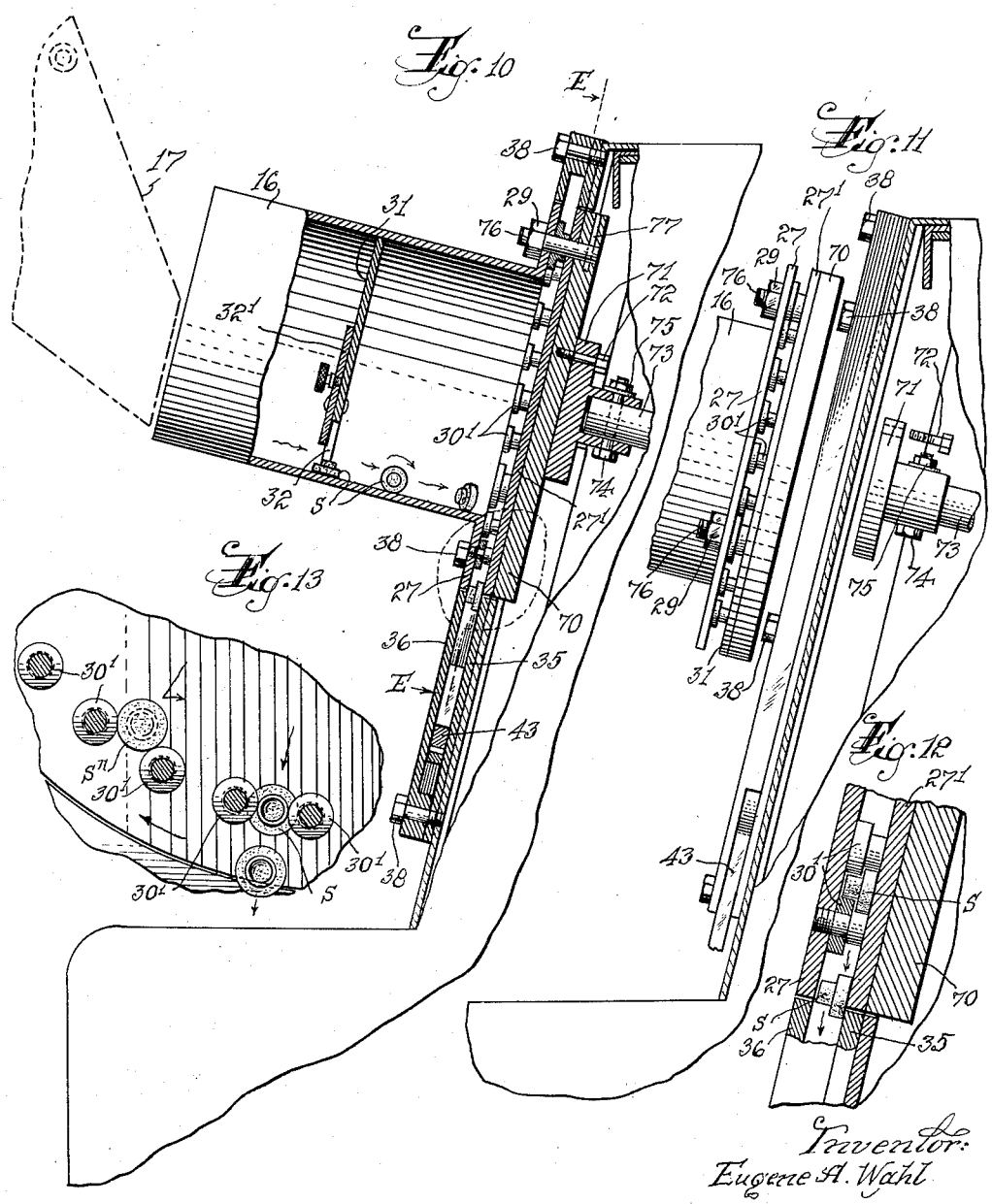

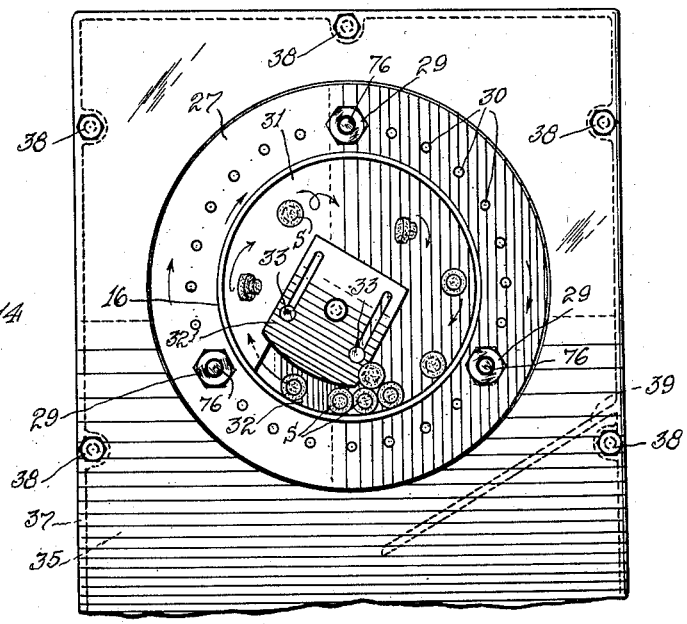
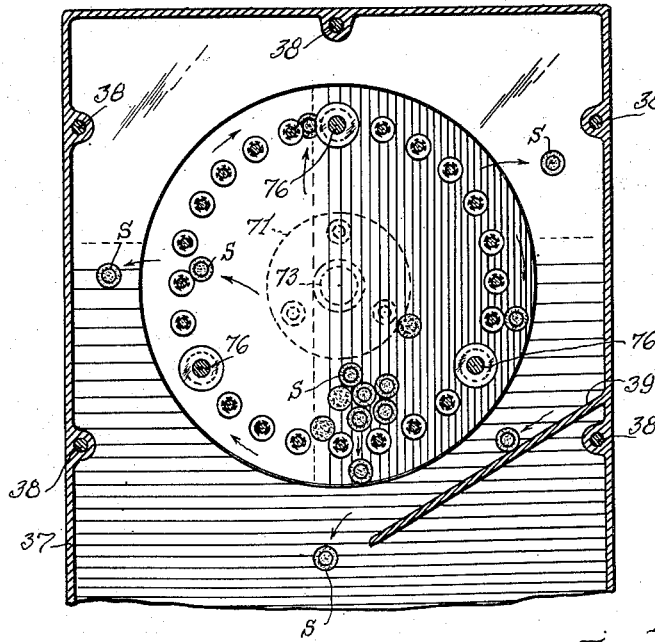

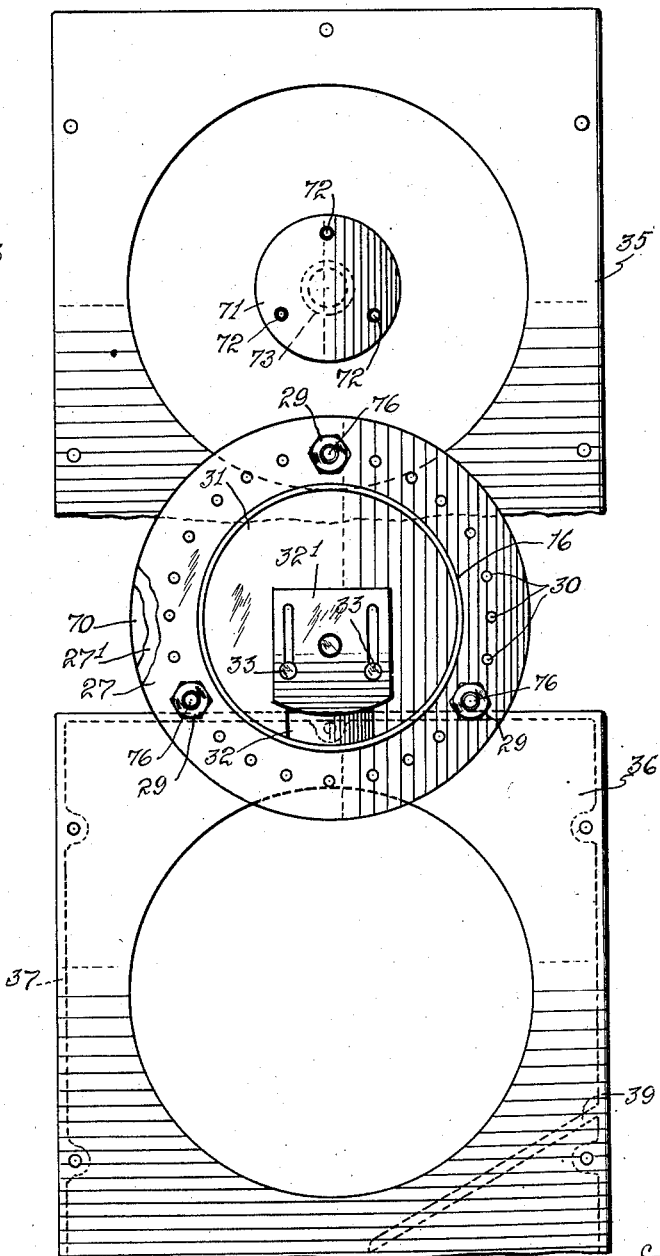

Feb. 4, 1958 E. A. WAHL 2,821,823
MACHINE FOR APPLYING STOPPERS TO BOTTLES
Filed Dec. 22, 1952 11 Sheets-Sheet 7

Inventor:
Eugene A. Wahl
BY
Taylor, Cifelli & Jurick
Attorneys

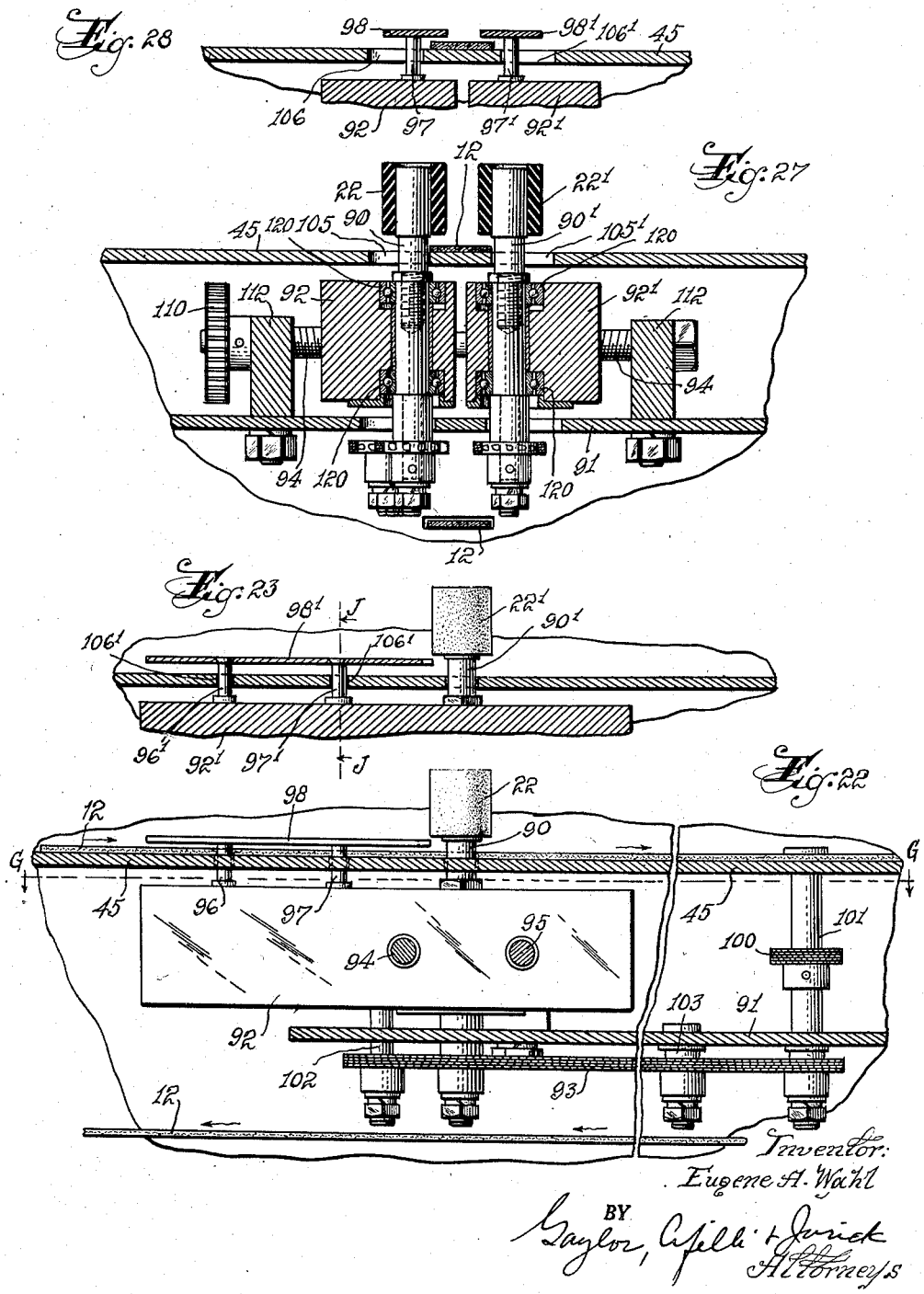

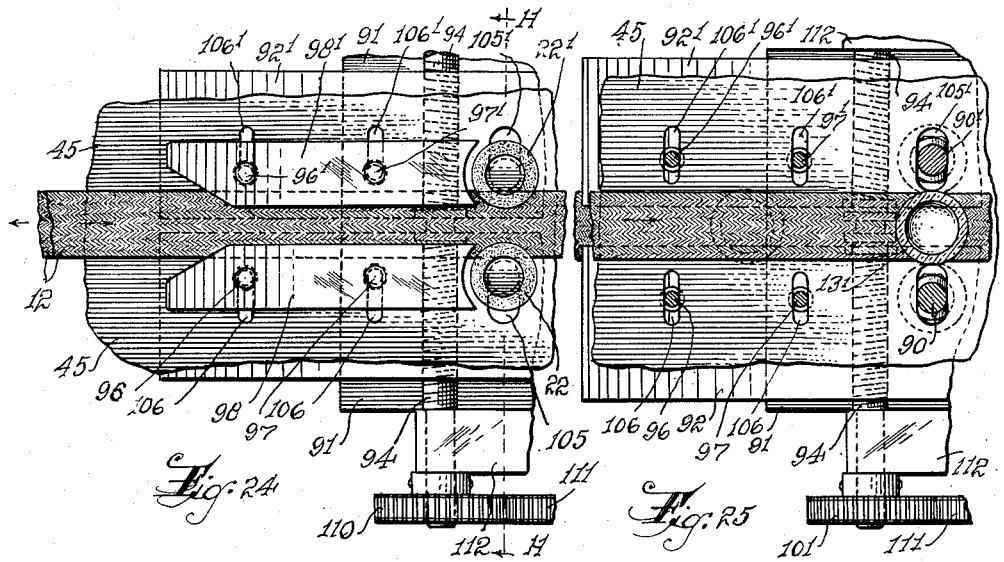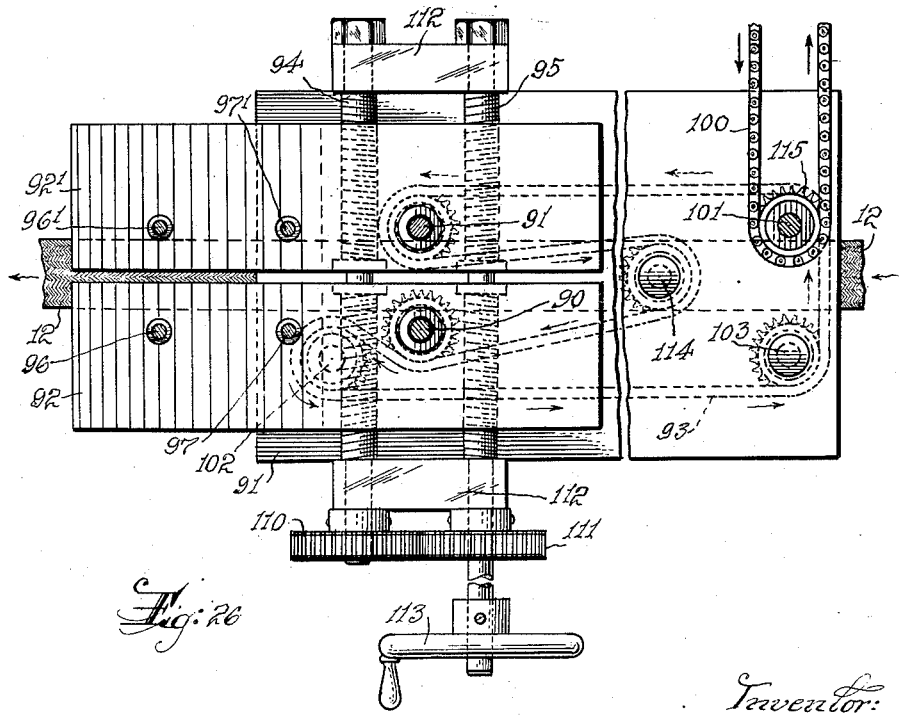

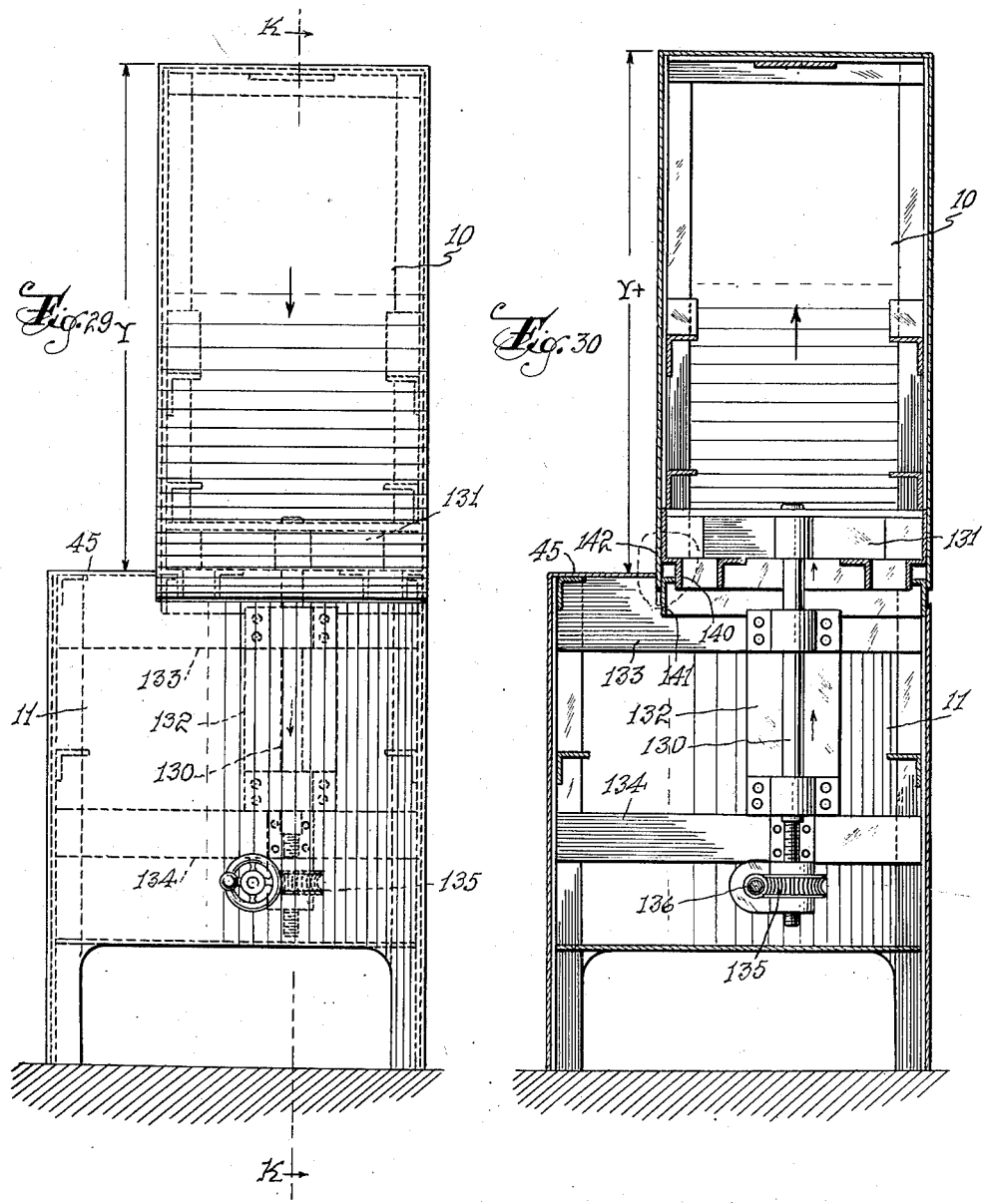

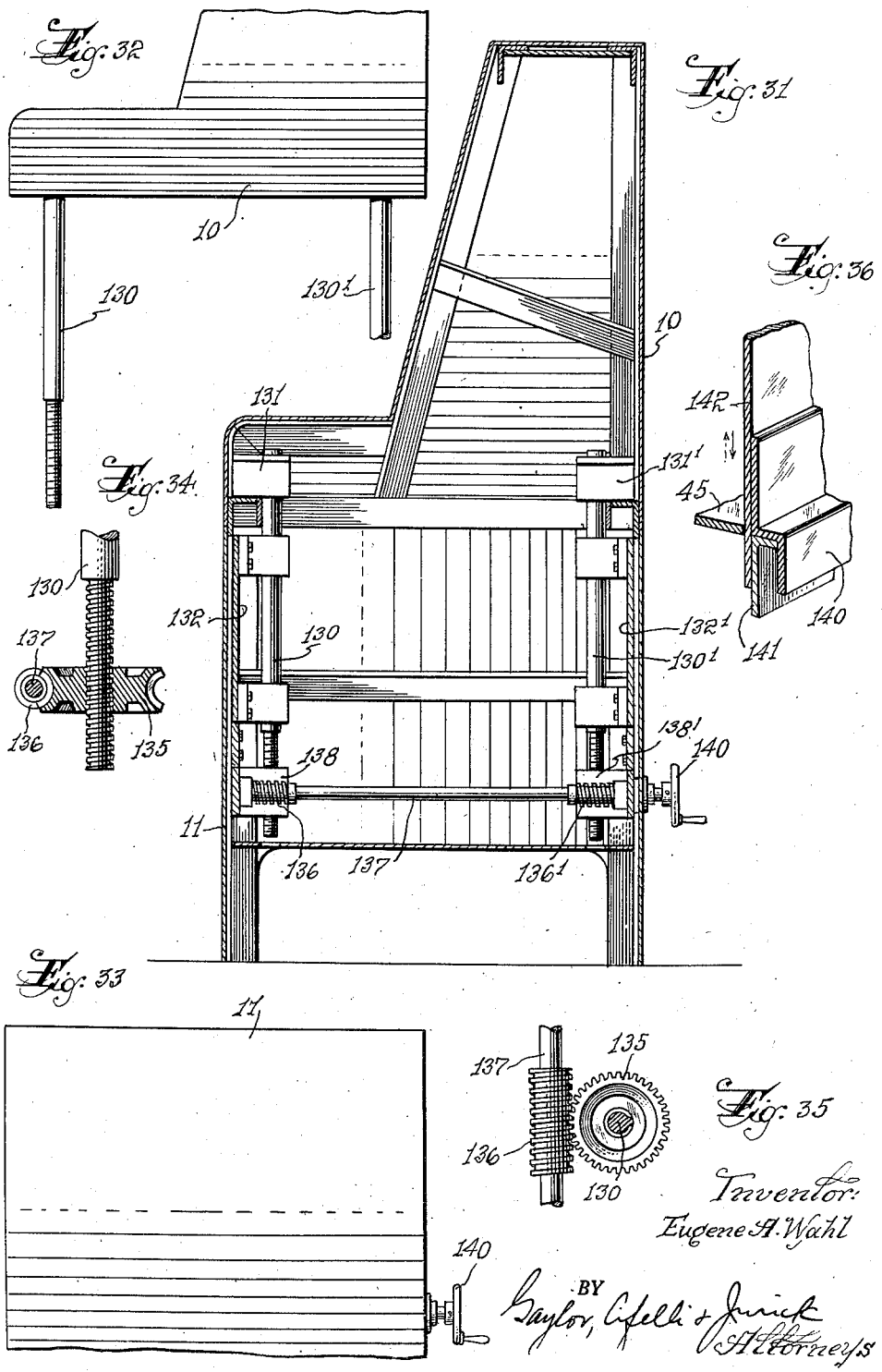

United States Patent Office 2,821,823
Patented Feb. 4, 1958

2,821,823

MACHINE FOR APPLYING STOPPERS TO BOTTLES

Eugene A. Wahl, Glen Ridge, N. J., assignor to Olin Mathieson Chemical Corporation, a corporation of Virginia Application December 22, 1952, Serial No. 327,267

22 Claims. (Cl. 53—43)

This invention relates to a bottle-capping machine and more particularly to a novel machine for automatically applying pliable stoppers of the stem and flange type to bottles at an operating rate greatly exceeding that heretofore possible and with positive reliability.

This application is a continuation-in-part of my United States patent application Serial No. 299,648, filed July 18, 1952 and entitled, Machine For Applying Stoppers To Bottles, now abandoned.

Various machines have been provided for automatically applying metal caps to bottles and jars. However, the adaptation of such machines, and the operating principles involved, to the job of inserting pliable stoppers of the stem and flange type into bottles has met with certain difficulties which, so far as I am aware, have not been overcome to date. In particular, the insertion of the stem of the stopper into the bottle results in a displacement of a considerable quantity of the contained air. In the case of a bottle that is only partially filled such compression of the contained air results in the stopper popping out of the bottle upon removal of the pressure means utilized for stopper insertion. If, on the other hand, the bottle is substantially filled with a liquid such insertion of the stopper stem into the neck of the bottle causes an overflow of the liquid.

A machine made in accordance with my invention overcomes the above-mentioned difficulties in that the stopper stem is inserted into the bottle in a rocking motion such that the displaced air can escape before the stopper is seated in the final, bottle-closing position.

My machine, while capable of general use, is particularly designed for applying pliable stoppers to relatively small bottles containing products of the pharmaceutical class. In addition to provisions for readily adapting the machine to bottles of different heights and/or different diameters, a machine of this class must provide for unique requirements peculiar to such specific use. Specifically, the stoppers are sterilized in the first instance and must remain so throughout the stopper-applying operations. To meet this requirement, all parts of the machine that come into contact with the stoppers must likewise be sterilized and, consequently, such parts must be arranged for easy dismantling and reassembly, by unskilled help, to facilitate the periodic sterilization thereof. Further, the sterilized stoppers are of a sticky, or tacky, character and the mechanism for orienting and feeding the stoppers to the stopper-applying station must be capable of advancing the tacky stoppers at a positive rate of speed without clogging.

As will become apparent hereinbelow a machine made in accordance with this invention includes these essential features as well as others of a more general character.

An object of this invention is the provision of an efficient machine for automatically applying resilient stoppers of the stem and flange type to bottles at a high rate of speed and with positive operating reliability.

An object of this invention is the provision of an automatic machine for applying tacky stoppers of the stem and flange type to bottles.

An object of this invention is the provision of a machine for automatically orienting stoppers of the stem and flange type and applying such stoppers to bottles moved in succession on a conveyor belt, said machine being of simple construction to promote rapid and positive operation.

An object of this invention is the provision of an automatic machine for inserting resilient, sterilized stoppers into bottles and in which all parts coming into contact with the sterilized stoppers can readily be dismantled and reassembled for purposes of periodic sterilization.

An object of this invention is the provision of an automatic machine for applying resilient stoppers to bottles and comprising a chute, means for properly orienting the stoppers in the chute as they are fed from a hopper, means for moving a succession of bottles under the end of the chute, means for dislodging a stopper from the chute with the stopper stem in registry with a bottle, and means for applying a rocking movement to the stopper and pressing the stopper stem into the neck of the bottle.

An object of this invention is the provision of an automatic machine for applying flanged stoppers to bottles said machine comprising a substantially vertical chute, a rotatable hopper disposed over the chute, a stopper storage area communicating with the hopper and the chute, automatic means for feeding stoppers from the hopper to the storage area in unidirectional orientation, vibratory means for feeding the stoppers from the storage area to the chute, means normally retaining the lowermost stopper in the chute with the stopper flange exposed beyond the chute end, means for moving a succession of bottles under the end of the chute so that each bottle will engage the exposed flange of the lowermost stopper whereby the bottle dislodges the stopper from the chute with the stopper flange in registry with the open neck of the bottle, and means for pressing the stopper stem into the neck of the bottle with a rotary motion.

An object of this invention is the provision of an automatic machine for applying flanged stoppers to vertically-disposed bottles moved in succession on a conveyor belt said machine comprising a substantially vertical chute loosely accommodating a single row of stoppers with their flanges in a substantially vertical plane, means normally retaining the lowermost stopper in the chute with a portion of the stopper flange exposed beyond the chute end and in the path of travel of the lips of the bottles, power-driven means engaging opposed portions of the bottles for positive movement of the bottles under the chute end and dislodgment of the lowermost stopper from the chute, means for pressing the dislodged stopper into the bottle, manually-adjustable means for altering the spacing between the said power-driven means, and manually-adjustable means for altering the height of the chute end with respect to the conveyor belt.

An object of this invention is the provision of a novel chute for feeding flanged stoppers to the capping mechanism of an automatic bottle-capping machine said chute comprising a channeled member for loosely accommodating a vertical row of stoppers, a rotatable shaft, means for removably securing the channeled member to the shaft, power-driven means for imparting a vibratory movement to the channeled member about the axis of said shaft, said channeled member being secured to the shaft at a point proximate to the lower end of the channeled member, and means for normally supporting the lowermost stopper in the chute with the stopper flange exposed beyond the end of the chute and in a substantially vertical plane.

An object of this invention is the provision of a novel hopper and stopper orienting arrangement for an automatic machine for applying stem and flange stoppers to bottles, said arrangement comprising a pair of plates spaced apart in parallel relationship a distance slightly greater than the axial length of the stoppers, a rotatable hopper, a partition dividing the hopper into an inner chamber and an outer chamber said partition including an opening, means for adjusting the size of the said opening, a plurality of radially-extending chambers in the hopper and communicating with the space between the said plates, said apertures having a shape corresponding to that of the stoppers.

These and other objects and advantages will become apparent from the following description when taken with the accompanying drawings illustrating the construction and operating principles of my machine. It will be understood that the drawings are for purposes of illustration and are not to be construed as defining the scope or limits of the invention, reference being had for the latter purpose to the appended claims.

In the drawings wherein like reference characters denote like parts in the several views:

Figure 2 is a fragmentary, elevation showing the left side of the machine, and drawn to an enlarged scale with a portion of the top, inclined plate broken away to show the movement of the stoppers from the hopper to the storage area and thence into the chute;

Figure 3 is a fragmentary, front view drawn to a still larger scale, with certain parts in section, and showing the lower end of the chute and the means for attaching same in operating position;

Figure 4 is a sectional view taken along the line A—A of Figure 3 and showing the rotary cam for imparting a vibratory motion to the chute as a whole;

Figure 5 is an isometric view showing the mounting block to which the chute is removably attached as a unit;

Figure 6 is a stripped-down view related to Figure 4 and presented to show the vibratory movement of the chute;

Figure 7 is an elevation view of the chute proper;

Figure 8 is a transverse sectional view taken along the line B—B of Figure 7;

Figure 9 is a transverse sectional view taken along the line C—C of Figure 7;

Figure 10 is, essentially, a sectional view taken along the line D—D of Figure 2 and shows the movement of the stoppers in the hopper;

Figure 11 is an elevation similar to Figure 10 but showing the complete hopper assembly dismantled as a unit from the flange that is attached to a power-driven shaft;

Figure 12 is a fragmentary, enlarged view of the portion enclosed by the broken line in Figure 10;

Figure 13 is an enlarged, fragmentary sectional view looking toward the hopper and illustrating how properly oriented stoppers leave the hopper in a radial direction;

Figure 14 is a fragmentary view of the left side of the machine, similar to Figure 2, but showing only the upper part of the machine that is associated with the hopper;

Figure 15 is similar to Figure 14 but is a sectional view taken along the line E—E of Figure 10;

Figure 16 is an exploded view illustrating the hopper removed from the drive flange and the front, inclined plate removed from the associated lower plate;

Figure 21 is a view similar to Figure 17 but showing power-driven belts for moving the bottle under the chute in place of the feed-rollers of the Figure 17 embodiment;

Figure 22 is a fragmentary view, with parts in section, showing the front feed roller and the associated supporting means and driving mechanism;

Figure 23 is similar, generally, to Figure 22, and showing the rear feed roller;

Figure 24 is a top view, looking down on the feed rollers and showing the guide plates for leading the bottles to the feed rollers and a portion of the arrangement for adjusting the spacing between such rollers;

Figure 25 is similar to Figure 24 with the guide plates and rollers removed and showing the device set to accept bottles having a larger diameter;

Figure 26 is a sectional view taken along the line G—G of Figure 22;

Figure 27 is a transverse sectional view taken along the line H—H of Figure 24;

Figure 28 is a transverse sectional view taken along the line J—J of Figure 23;

Figure 29 is an elevation showing the right side of the machine with the conveyor belt, feed rollers and chute omitted;

Figure 30 is similar to Figure 29 with the covering panel removed to show the mechanism for raising the upper cabinet relative to the lower cabinet;

Figure 31 is a sectional view taken along the line K—K of Figure 29;

Figure 32 is a fragmentary elevation showing the height-adjusting bolts extending downwardly from the upper cabinet;

Figure 33 is a fragmentary elevation showing the complimentary portion of the lower cabinet;

Figure 34 is a view, with parts in section, showing one of the height-adjusting bolts and the associated worm gear by which the bolt is raised or lowered;

Figure 35 is a plan view of the mechanism shown in Figure 34; and

Figure 36 is a fragmentary, isometric view showing how the covering panel of the upper cabinet slides up and down in a space provided for this purpose between the rear side of the conveyor-supporting ledge and the upper cabinet.

Figure 1:
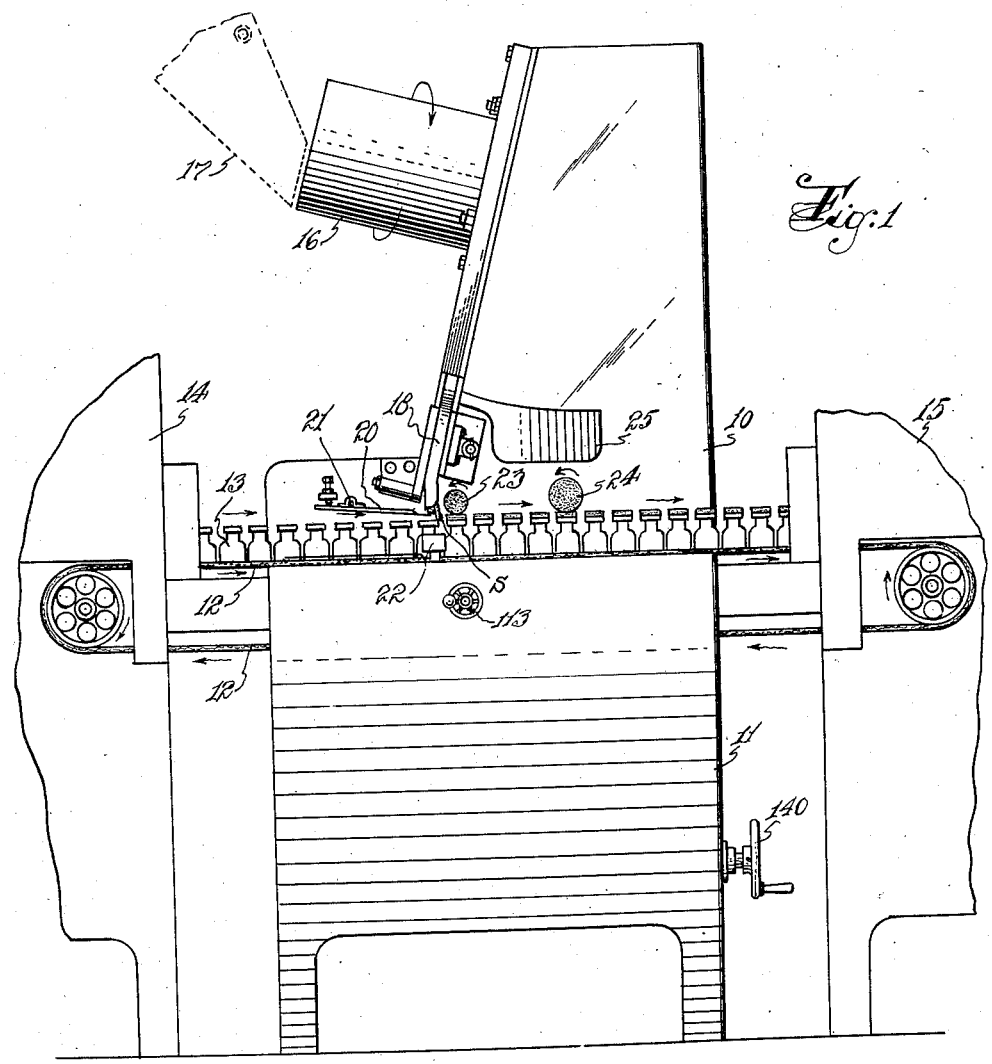
Figure 1 is an elevation view showing the front of the complete machine.

Reference is now made to Figure 1 showing the upper cabinet 10 and the lower cabinet 11. The lower cabinet has a flat ledge that supports the conveyor belt 12 carrying a succession of bottles 13. As shown in the drawing, the conveyor belt may extend beyond the limits of the machine to carry bottles from a filling machine 14 and to deliver them to a packaging machine 15. However, it may here be pointed out that the conveyor belt preferably is power-driven by means disposed in the machine proper whereby the device forms a complete, unitary bottle-capping machine. The upper cabinet 10 carries a rotatable hopper 16 into which stoppers of the stem and flange type may be fed as through the chute 17. Such hopper is of a novel construction provided with means for automatically orienting and feeding a succession of stoppers to a chute 18, as will be described in detail hereinbelow. Suffice to say for the present that the chute 18 loosely accommodates a vertical row of properly oriented stoppers, the lowermost stopper S being visible in the drawing. A finger 20, pivoted at 21, has a very thin forward end spaced longitudinally of the chute end and positioned to form a rest for the stem of the lowermost stopper whereby the stopper is retained in the chute loosely and with the flange in a substantially vertical plane. The spacing of the lower end of the chute above the tops of the bottles is such that the lower portion of the stopper flange will be engaged by the lip of a bottle as the latter moves under the chute. Just prior to the actual engagement of the bottle with the stopper, the bottle is engaged between two resilient feed rollers which are power-driven, the front roller 22 being visible in the front view of Figure 1. These rollers have a surface speed equal to the linear speed of the conveyor belt and by means of frictional pressure applied to opposed sides of the bottle they drive the bottle past the chute end with a positive force. As the bottle passes by the chute end it engages the exposed flange of the stopper whereby there is imparted to the stopper a combined linear and rocking (rotary) motion resulting in a dislodgement of the stopper from the chute with the stopper stem falling into registry with the open neck of the bottle. As will be described in detail with specific reference to Figures 17-20, the stopper stem is then rotatively pressed into the bottle by a power-driven roller 23 having a surface speed of from 15-40 percent lower than the linear speed of the bottle. A subsequent, larger-diameter roller 24 may be provided to further press the stopper into the bottle although the roller 23 is satisfactory in most cases. A container 25 is disposed under an appropriate opening that communicates with the chute 18 whereby excess stoppers coming from the hopper 16 will flow into the container thereby preventing a clogging of the stoppers in the operative area of the chute.

Reference is now made to Figure 2 which is a fragmentary view restricted, essentially, to the upper cabinet and looking into the cylindrical hopper 16. The inner end of the hopper is welded, or otherwise secured, firmly to an upper circular plate 27, said plate having a circular aperture into which the hopper is inserted, and this plate is spaced from and secured to a lower, circular plate by the nuts 29 cooperating with suitable bolts extending forwardly from the lower plate. This lower plate has a diameter corresponding to that of the upper plate 27 but is solid and forms an effective closure for the inner end of the hopper and the two plates are spaced apart, in parallel relation, by a series of peripherally-spaced studs 30, here shown of constant diameter to facilitate a proper understanding of the invention. Actually, these studs are so shaped that stoppers can pass outwardly from the hopper only if properly oriented, as will be explained in detail with reference to Figures 10-13. The hopper proper is divided into two distinct chambers by means of a transverse partition 31 having an aperture 32 therein and the effective size of such aperture may be adjusted by means of a flat plate 32' and the knurled screws 33 which pass through the elongated openings in the plate 32' and are threaded into cooperating holes in the partition. As the hopper rotates, the stoppers, which are fed into the forward chamber, will pass to the rear chamber and such stoppers will move toward the lower plate since the hopper is inclined, as shown in Figure 1. Such stoppers will be moved outwardly by gravity and/or centrifugal force and some of those stoppers which are properly oriented will pass radially out of the hopper (between the studs 30) and fall downwardly into a storage area 34. This storage area comprises a space between the rear, inclined plate 35 and the front, inclined plate 36, said plates being spaced apart, in parallel relation, a predetermined distance by the rim members 37. I make the upper plate removable by simply unfastening the nuts 38. Actually, the spacing between these plates is slightly greater than the axial height of the particular stoppers whereby the stoppers cannot depart from the oriented positions as received from the hopper.

The stoppers coming from the hopper are directed toward the left by a fixed deflector 39 and fall upon the tapered, long arm 40 of the chute 18, said arm sloping downwardly toward the right. It will be apparent that the operation of the hopper can be adjusted to furnish a desired supply of stoppers to the storage area. In order to assure an adequate supply of stoppers to maintain the chute filled at all times, I adjust the effective size of the opening 32, in the hopper partition 31, and the rotary speed of the hopper so that stoppers are fed to the storage area at a rate somewhat greater than the bottle-capping rate of the machine. Excess stoppers, such as the upper row of stoppers identified by the letters S', move out of the storage area through the opening 41 and into the overflow container 25, shown in Figure 1. These stoppers are returned periodically to the hopper by the operator.

For purposes of clarity, the chute 18 is not shown filled with stoppers as is actually the case during operation of the machine. It will be noted that the chute 18 comprises the long, tapered arm 40 and the short arm 43 separated by the channel 44 that is undercut, or recessed, as shown by the dotted lines. The narrow, transverse dimension of this channel is somewhat greater than the diameter of the stopper stem and the similar dimension of the undercut portion is somewhat greater than the diameter of the stopper flange. Also, the depth of the undercut portions is somewhat greater than the axial thickness of the stopper flange. From this it will be apparent that the stoppers are accommodated quite loosely in the chute yet the contained stoppers cannot leave the chute except from the lower chute end. Although not shown in Figure 2, the lowermost stopper is retained in the chute by the finger 20, see Figure 1 and the fragmentary, enlarged view of Figure 3. Figure 2 does, however, show the top ledge 45 of the lower cabinet 11, and the conveyor belt 12 for reference purposes.

Reference is now made to Figures 3-5, inclusive. A bracket member 53 is secured rigidly to the upper cabinet by the bolts 54 and includes an integral, heavy portion having a bore hole running therethrough to form a bearing for the shaft 55. This shaft has a threaded end on which the nut 56 is threaded. The other end of the shaft passes into a hole 57 in a mounting block 49 and these two parts are secured together by a pin 58. The chute 18 is secured, as a unit, to the mounting block 49. As shown in the isometric view of Figure 5, the block 49 includes a channel 50 which is made to accommodate the vertical portion of the long chute arm 40 (see also Figure 2). In order to secure the chute to the mounting block I provide a lug 47 having an offset base secured to both chute arms by four bolts 51, the forward two bolts being visible in Figure 3. A wing nut 46 passes through a clearance hole in the lug and into a threaded hole 48 in the mounting block, see Figure 5. It will now be apparent that the chute can be removed from the machine by merely unscrewing the wing nut 46 thereby facilitating the sterilizing of the chute. Also, the chute and mounting block are pivotally secured to the upper cabinet by the shaft 55 and the connecting pin 58.

The specific purpose for pivotally mounting the chute will now be described. Figure 4 is a sectional view taken along the line A—A of Figure 3. Here are shown the horizontal ledge 45 of the lower cabinet, the front plate 60 of the upper cabinet, the rear of the mounting block 49 and the long and short arms 40, 43, respectively, of the chute. A coiled spring 61 has one end attached to the mounting block 49 and the other end attached to a fixed support disposed within the upper cabinet, said spring normally biasing the block against a pivotally-mounted cam 62 that is power-driven as by means of the belt 63. A study of Figures 2 and 4 will show that revolution of the cam imparts a vibratory movement to the chute about the axis of the shaft 55. Since the pivot axis for such oscillatory movement of the chute is at the lower chute end the chute will have a minimum vibration amplitude near the lower end whereas the long arm 40 of the chute will have a maximum vibration amplitude as is shown in the stripped-down view of Figure 6. In Figure 6 the extent of the vertical vibration of the chute arm 40 is exaggerated for purposes of clarity, the dotted and solid line showings representing the lowermost and uppermost positions, respectively, of the arm.

The described vibratory, or oscillatory, movement of the chute is of particular importance when my machine is employed for operation with pliable stoppers which have been sterilized. Such stoppers are sticky, or tacky, and would normally adhere to contacted parts, particularly if the machine has been shut down for a period of time. The relatively large, vertical movement of the chute arm 40 causes the stoppers in the storage area, see Figure 2, to bounce vigorously thereby assuring a proper flow of the stoppers into the chute proper and, when necessary, positive passage of the excess stoppers out of the storage area into the overflow container 25, see Figure 3. On the other hand, the relatively small vibration of the lower end of the chute assures a proper downward flow of the stoppers without causing the lowermost stopper to fall out of the chute.

Figure 7 illustrates the chute per se. The long arm 40 and the short arm 43 are secured together by a backing plate 65 welded thereto. It will be noted that the facing side edges of the two arms are provided with milled recesses as shown by the dotted lines in Figure 7 and as clearly shown in the transverse sectional views of Figures 8 and 9 taken along the lines B—B and C—C, respectively, of Figure 7. It is pointed out that the milled recess in the short arm extends the entire length of the arm whereas the similar recess in the long arm terminates at a point somewhat beyond the end of the short arm. Such construction aids the alined entrance of the stoppers into the chute as will be apparent from a study of Figure 2. It is also pointed out that the backing plate 65 does not extend to the ends of the short chute arm and that the plate does not enter into the upper cabinet.

Having described the construction of the chute and its vibratory operation, reference is now made to Figures 10–12, inclusive, for a description of the hopper construction and operation. Figure 10 is a sectional view taken along the line D—D of Figure 2 and Figure 11 is a corresponding elevation view with a portion of the covering panel broken away to show the drive shaft for rotating the hopper. Here, the hopper 16 is shown secured to the outer, circular plate 27 which has a circular opening into which the hopper end is fitted. These parts are made unitary, as by welding, whereby the plate forms a laterally-extending flange for the hopper. The outer plate 27 is spaced from an inner, circular plate, or disc, 27' which is solid and, therefore, forms an effective closure for the hopper. Actually, the plates are spaced apart in parallel relation by the headed studs 30' which have reduced-diameter ends force-fitted into suitable holes in the outer plate 27. Alternatively, these studs may be threaded in holes in the plate. It is here pointed out that the studs are positioned on a circle exceeding the outside diameter of the hopper and the circumferential spacing between studs is such that only those stoppers which have their flange in flush contact with the back plate 27' can pass radially therebetween. Inner plate 27' lies flush on a heavier plate 70 which is secured to the base of a flange 71 by three bolts 72, one such bolt being visible in these particular views. A power-driven shaft 73 is secured to the flange as by the bolt 74 and nut 75. Extending upwardly from the plate 70 are three bolts 76 said bolts having their inner ends rigidly secured to the plate as by pins 77. These bolts pass through clearance holes in the circular plates 27 and 27' and are provided with threaded ends to accept the nuts 29. Thus, the assembly comprising the hopper, outer plate 27 and the studs 30' is readily removed as a unit for sterilizing by simply removing the nuts 29. Obviously, the disc 27' may also be removed for sterilizing from which it will be apparent that all parts of the hopper coming into contact with the stopper are readily removable for periodic sterilization.

In operation, the rotation of the hopper results in a transfer of stoppers from the outer chamber into the inner chamber, through the opening 32 in the hopper partition 31, at a rate depending on the effective size of the opening and the speed of hopper rotation. Such stoppers move toward the inner disc 27' and are directed outwardly toward the studs 30' by gravity and/or centrifugal force. Those stoppers which have their flange in flush contact with the plate 27' eventually will slide between the studs while others will tumble down at some point in their more or less circular motion within the hopper. I set the speed of hopper rotation so that properly oriented stoppers will leave the hopper at any relative angle of hopper rotation. These stoppers slide downwardly along the inclined back plate 35 toward the long arm 40 of the chute, as has already been described with specific reference to Figure 2. In Figure 10, the spacing between the inclined plates 35 and 36 is clearly shown as corresponding to the spacing between the circular, hopper plates 27, 27'. Also, it should be noted that the thickness of the chute arms, such as the short arm 43 visible in these figures, is only slightly less than the spacing between the inclined plates 35, 36 so that there is no possibility of the stoppers becoming wedged between the chute arms and the plates.

Figure 13 is a fragmentary view looking into the front end of the hopper and illustrates the disposition of the studs 30' so that only a properly oriented stopper S can pass therebetween while the reversely-disposed stopper S'' is retained for rotation with the hopper until it falls downwardly by its own weight and/or by the force of other non-oriented stoppers. To facilitate a thorough understanding of the action of the stoppers, reference may be had to Figures 14 and 15, Figure 14 being a head-on view showing the hopper 16, the outer circular plate 27 and the front, inclined plate 35, whereas Figure 15 is a corresponding sectional view taken along the line E—E of Figure 10. It is again pointed out that the front, inclined plate 35 is removable simply by removing the nuts 38 whereby both plates can be sterilized periodically.

Figure 13A:
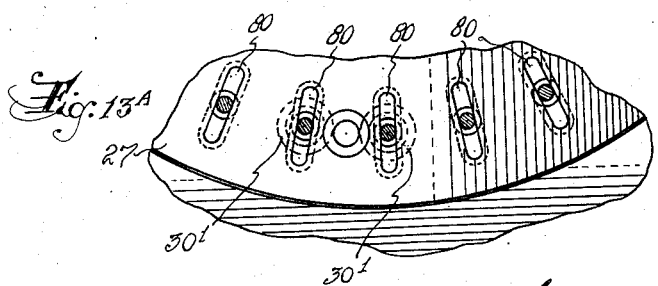
Figure 13A is similar to Figure 13 and showing a modification of construction whereby the passageways through which the stoppers leave the hopper may be adjusted to pass stoppers of a predetermined size.

Figure 13A, (included on the first drawing sheet) is, generally, similar to Figure 13 and shows a modification wherein the studs 30' are secured, individually, in the radially-extending slots 80 formed in the outer, circular plate 27. The studs will have threaded shanks passing through the slots and can be secured in any desired position along the slots by cooperating nuts, as is well known in the fastening art. The feature here being stressed is that the circumferential spacing between adjacent studs can be adjusted by moving the studs closer or further from the center of the plate 27 whereby the hopper may be conditioned to operate with stoppers having greater or smaller diameters.

Figure 16 is an exploded view showing the complete, assembled hopper disconnected from the driving flange 71 and the front, inclined plate 36 removed from the rear inclined plate 35, it being noted that each such plate has a circular opening just slightly larger than the diameter of the hopper plates 27, 27' and 70.

Figure 17:
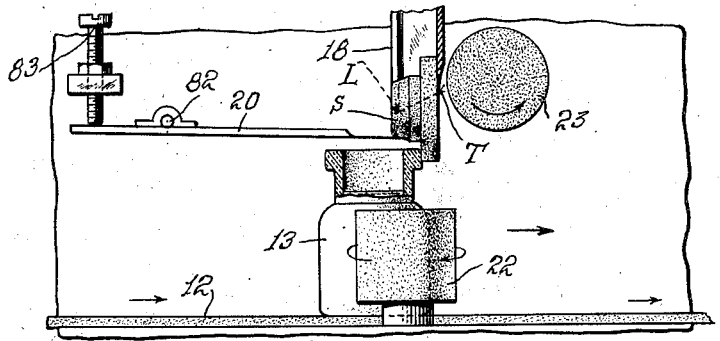
Figures 17–20 are fragmentary elevations of the front of the machine drawn to an enlarged scale and showing the progressive movement of a bottle under the chute end and dislodging a stopper from the chute.
Figure 18:
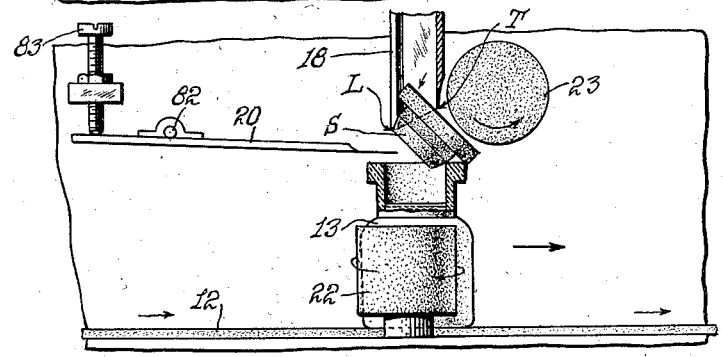
Figure 19:
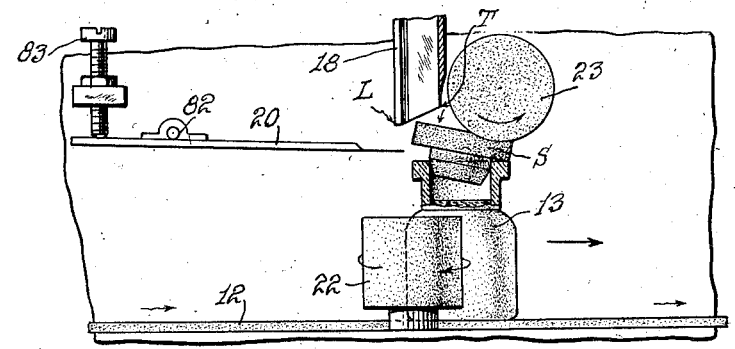
Figure 20:
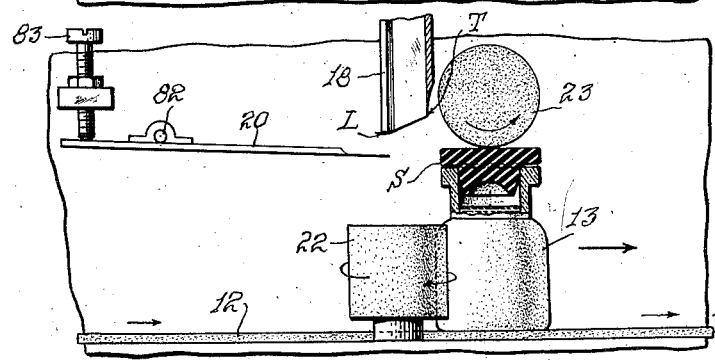

Reference is now made to Figures 17–20 which are fragmentary front elevations drawn to an enlarged scale and showing the progressive movement of a bottle past the lower end of the chute thereby resulting in the dislodgement of the lowermost stopper. The numeral identifications of the parts corresponds to those shown in Figure 1 but for purposes of clarity the chute 18 and the neck of the bottle 13 are shown in section. As the bottle is moved toward the right by the conveyor belt 12, opposed sides thereof are engaged by alined, resilient, power-driven feed rollers, the front feed roller 22 being visible in the elevation view shown. The surface speed of these feed-rollers is substatnially the same as the linear speed of the belt and the rollers are spaced apart a preset distance so that they will engage the bottle just prior to the instant that the lip of the bottle strikes the exposed flange of the lowermost stopper S. Figure 17 shows the bottle so engaged between the rollers and with the bottle lip just establishing contact with the stopper flange. As the bottle is moved a little further to the right it imparts a combined linear and rotary motion to the stopper, as shown in Figure 18. Such rotary motion of the stopper is made possible by the fact that the stopper is loosely disposed within the chute and the specific relationship of the leading edge L and the trailing edge T of the chute, it being noted that the trailing edge T is the shorter of the two and provides what may be termed a fulcrum for the pivotal, or rotational, movement of the stopper. As the bottle moves along, the stopper is dislodged from the chute, as shown in Figure 19. An important point, here stressed, is the fact that the stopper is dislodged from the chute solely by the motion of the bottle, the power-driven roller 23 being of no effect through-out that part of the operation shown in Figures 17–19. As the stopper is dislodged from the chute its stem is in registry with the open neck of the bottle whereupon the stem falls partially into the bottle neck, as clearly shown in Figure 19. It will be noted that the stopper, at this point, is disposed at an angle to the horizontal with the leading flange portion (that is, the flange portion closest to the roller 23) resting on the bottle lip and the trailing flange portion spaced from the lip. The feed rollers now drive the bottle to the point where the power-driven roller 23 engages the upper surface of the stopper flange, the point of contact corresponding substantially to the point of attachment of the stopper stem and flange. In view of the tilted position of the stopper, the downward pressure exerted by the roller 23 squeezes the stopper stem into the bottle in a rocking action. Such action permits the escape of air from the bottle until the stem is, effectively, completely inserted into the bottle thereby removing any possibility of the stopper popping out of the bottle under the force exerted by a compression of air in the bottle. Once the roller 23 has engaged the stopper the bottle is free of the feed rollers. It will be apparent that when the roller 23 engages the stopper flange, the stopper, as a whole, effectively is secured to the roller surface and, therefore, the stopper will have a peripheral speed greater than that of the roller surface. If, now, the surface speed of the roller is equal to the linear speed of the conveyor belt the bottle will be rocked forwardly whereas if the roller surface is excessively less than the belt speed the bottle will be rocked backwardly. In actual practice, I adjust the roller surface speed to approximately 25 percent less than the belt speed whereupon there is no tilting the bottles when the machine is operated at a capping rate in excess of 300 bottles per minute. By actual test I have found that entirely satisfactory operations obtain when the roller surface speed is from 15 to 40 percent less than the belt speed. Beyond this range operating reliability decreases as some bottles will tip over.

Attention is now directed to the finger 20 having a thin end spaced longitudinally of the chute end to form a rest for the lowermost stopper in the chute. This finger is pivotally mounted on a shaft 82 and a set screw 83 prevents clockwise rotation thereof. Adjustment of the set screw establishes the spacing of the finger end from the chute end. I preferably set this adjustment so that a little more than one half of the stopper flange extends beyond the trailing edge of the chute, the Figure 17 proportions corresponding substantially to actual practice. In the event a bottle having a somewhat greater height passes under the chute the bottle lip will merely elevate the thin end of the finger thereby raising the stopper an equivalent amount. A shorter bottle will strike the stopper flange at a lower point. Within the normal range of height variations the mechanism just described will operate with complete reliability. The adjustment of the height of the chute above the conveyor belt and the adjustment of the spacing between the feed rollers to condition the machine for operation with taller and wider bottles, respectively, will be described hereinbelow.

In Figures 17–20 the power means for positively driving the individual bottles under the chute comprises a pair of feed rollers. If it is desired to extend the range within which the bottles are moved under positive power a belt arrangement may be used, as shown in Figure 21. Here I show an endless belt 85 extending around a pair of pulleys 86 spaced longitudinally of the conveyor belt 12. One of these pulleys is power-driven. As similar belt and pulley arrangement is disposed to the rear of the conveyor belt from which it will be apparent that the bottles are power driven for a substantial distance to the left and right of the chute 18.

I shall now describe the mechanism associated with the two feed rollers and which affords quick, manual adjustment of the spacing between the rollers for the acceptance of bottles of a given diameter. Referring first to Figure 22, which is a fragmentary front view with parts shown in section for clarity of disclosure, the conveyor belt 12 is shown supported on the top 45 of the lower cabinet. The front feed roller 22 is secured to the upper end of the shaft 90 which extends through an elongated slot in the top 45 and forward of the belt 12. A supporting plate 91 is secured in fixed position relative to the top 45 by suitable means not shown in the drawing. The shaft 90 extends through a metal block 92 and has a sprocket attached at the lower end for engagement by the drive chain 93. Extending laterally through the block 92 are two reversely threaded screws 94, 95 whose function will be described below with reference to Figure 26. Rigidly secured to the block 92 are two posts 96, 97 that also extend through elongated slots in the top 45 and forward of the conveyor belt. The forward guide plate 98 is secured to the posts 96, 97 as shown. While I shall describe the chain drive mechanism for rotating the feed roller 22 with specific reference to Figure 26 I here wish to point out that a chain 100 is connected to a motor and rotates the shaft 101 that is free to rotate in suitable bearings carried by the top 45 and the supporting plate 91. The endless chain 93 passes over a sprocket carried by the lower end of the shaft 101, and over cooperating sprockets carried by the feed roller shaft 90 and the shafts 102 and 103.

Figure 23 is similar to Figure 22 but showing the rear feed roller 22' carried by the shaft 90' extending through the metal block 92', the latter supporting the posts 96' and 97' to which the rear guide plate 98' is attached.

Reference is now made to Figure 24 which is a plan view looking down on the feed rollers 22, 22' and the guide plates 98, 98'. The shafts supporting the feed rollers and the studs to which the guide plates are attached extend through the associated elongated slots 105, 105' and 106, 106', respectively, in the top plate 45. Note that the slots are disposed on opposite sides of the conveyor belt 12. One of the reversely-threaded screws 94, see also Figure 22, is shown in dotted lines. If the forward half of this screw has a right hand thread and the rear half a left hand thread, it will be apparent that rotation of the screw by means of the gear 110 will cause the two metal blocks 92 and 92' to move further apart or closer together. The guide plates 98, 98' and the feed rollers 22, 22' will move with the blocks 92, 92' from which it is clear that the feed rollers and guide plates can be set to a desired spacing by merely rotating the reversely-threaded screw. Figure 25 is similar to Figure 24 but is a sectional view taken along the line G—G of Figure 22. However, the metal blocks 92, 92' are spaced somewhat farther apart to accept a larger-diameter bottle 13'. While the fragmentary views shown in Figures 24 and 25 show only the single, reversely-threaded screw 94, Figure 26 shows both screws 94 and 95 operating in the threaded holes in the metal blocks 92, 92'. The forward and rear ends of these screws are threadless and journaled in the end blocks 112 which are rigidly secured to the supporting plate 91. These reversely-threaded screws are turned in unison by means of the hand wheel 113 and the cooperating gears 110 and 111, the hand wheel being accessible from the front of the machine as shown in Figure 1.

The chain linkage for power driving the feed rollers is also shown in Figure 26. The chain 100, connected to an electric motor, rotates the shaft 101 by means of the sprocket gear 115. The shafts 103 and 102 (see also Figure 22) and the shaft 114 each carry idler gears of the sprocket type whereas the shafts 90, 90' (which carry the feed rollers) have similar sprocket gears rigidly secured thereto. A second, similar sprocket gear is secured to the main shaft 101. These gears are all interconnected by the endless chain 93, as shown. By positioning the shaft 114 a reasonable distance from the idler pulleys, say eight inches or so, the two feed rollers may be moved to either of their extreme positions of separation without materially altering the total linear length represented by the chain, it being noted that the shaft 114 is disposed in a vertical plane equally spaced from the feed roller shafts and that the two idler shafts 102 and 103 move with the feed roller shaft 90.

Attention is now directed to Figure 27 which is a transverse sectional view taken along the line H—H of Figure 24. This view shows the end blocks 112 which are secured to the lower supporting plate and which serve as bearings for the reversely-threaded screws that are threaded through holes in the metal blocks 92, 92'. The feed roller shafts 90, 90' rotate within the ball bearings 120 carried by the blocks and move in the slots 105, 105' in the top plate 45 as the blocks 92, 92' are moved in response to rotation of the reversely-threaded screws.

Figure 28 is a transverse sectional view taken along the line J—J of Figure 23 and shows the front and rear guide plates 98, 98' supported by the posts carried by the blocks 92, 92'.

Having now given a detailed description of the mechanism illustrated in Figures 22–28, it will be clear that my machine may be set to operate with bottles of different diameters by merely turning a single hand wheel that is accessible at the front of the machine. The range of such adjustment is set to accommodate any of the standard size bottles used to contain antibiotics and other pharmaceuticals. Those skilled in this art will understand that a suitable index can be associated with the hand wheel such index being rotatable over a suitably calibrated scale plate secured in relatively fixed position on the cabinet. The scale plate may be calibrated, for example, in terms of bottle diameters whereby the operator can set the index to the scale marking corresponding to the diameter of the particular bottles thereby adjusting the spacing between the feed rollers to the proper distance.

It remains now to describe the mechanism for adjusting the spacing of the chute with respect to the conveyor belt to adapt the machine for use with bottles of a different height. For this purpose reference will be made to Figures 29–36.

I refer first to Figures 29 and 30, Figure 29 being a side elevation view of the right side of my machine with the conveyor belt, feed rollers and chute omitted for purposes of clarity and Figure 30 being similar to Figure 14 but with the covering panel removed. As has already been described, the conveyor belt is supported by the top plate 45 of the lower cabinet 11 whereas the chute is attached as a unit to the upper cabinet 10. Thus, the spacing of the chute end above the conveyor belt can be set by moving the upper cabinet with respect to the lower cabinet as shown by the dimensions $Y_1$ $Y_+$. This is done by a simple arrangement comprising, essentially, a pair of threaded bolts secured to the upper cabinet and extending into engagement with a gearing system carried by the lower cabinet. As shown more clearly in Figure 30 one such threaded bolt 130 is secured, as by welding, to a cross bar 131 welded to the frame of the upper cabinet. The lower cabinet includes a vertically-disposed journal block 132 rigidly secured to the spaced cross bars 133, 134. The bolt 130 is free to slide up and down in the journal block while the reduced-diameter, lower end of the bolt is threaded and passes through a central, threaded hole in the gear 135 which cooperates with the worm 136. Reference is now made to Figure 31 which is a vertical sectional view taken along the line K—K of Figure 29. Here are shown the two bolts 130, 130', each slidable within the associated journal blocks 132, 132' and each having its lower, threaded end passing through a central, threaded hole in the associated gears. These gears are retained in blocks 138, 138' in such manner that the gears are free to rotate but cannot move in a vertical direction. Consequently, when these gears are rotated by their associated worms 136, 136' which are rigidly secured to the shaft 137, the bolts 130, 130' will be forced to move upwardly or downwardly thereby raising or lowering the upper cabinet with respect to the lower cabinet. Figures 34 and 35 show my particular gearing arrangement. The threaded, lower end of the bolt 130 passes through a central, threaded hole in the gear 135. This gear is rotated upon rotation of the worm 136 secured to the shaft 137 and such gear rotation must result in a vertical movement of the bolt 130 if the gear 135 is restricted so that it itself cannot move out of its original plane. A hand wheel 140 (see also Figure 1) is provided for rotation of the shaft 137. As explained hereinabove with reference to the hand wheel employed to alter the spacing between the feed rollers, the wheel 137 may also carry an index member cooperating with a relatively stationary scale plate calibrated in terms of bottle heights whereby the operator may set the machine for proper operation with particular bottles by merely alining the index with the corresponding scale marking. Figures 32 and 33 are fragmentary, elevation views showing the lower portion of the upper cabinet 10 and the complimentary, upper portion of the lower cabinet 11.

Figure 36 is a fragmentary isometric view showing, in enlarged scale, that portion of Figure 30 enclosed by the broken line. The angle bracket 140, attached to the front panel 142 of the upper cabinet, is of step shape designed to accommodate the L-shaped angle bracket 141 that is secured to the lower cabinet. It will be noted that the top 45 (which is an integral part of the lower cabinet and which supports the conveyor belt) has its inner side-edge spaced from the angle bracket 141 thereby providing a slot in which the front panel 142 slides as the upper cabinet is moved vertically relative to the lower cabinet. Although not specifically shown in the drawings the covering panels enclosing the upper cabinet can be made to partially overlie the similar panels enclosing the lower cabinet thereby maintaining a pleasing external appearance regardless of the actual relative positions of the two cabinets.

Having described my invention in detail it will be apparent that I have provided a machine having the following important features.

(1) The mechanism for automatically applying the stoppers to the bottles is of simple construction and operating principle which makes possible a high operating speed with complete reliability and a minimum of maintenance.

(2) The design and construction of the hopper for the automatic orientation of the stoppers is likewise simple and straight forward.

(3) The machine will function positively with stoppers which have been sterilized and are of a tacky character.

(4) The rate at which the stoppers are expelled from the hopper can be adjusted simply and quickly.

(5) A required, positive supply of stoppers is maintained in the chute thereby removing the possibility of a bottle passing through the machine without a stopper applied thereto.

(6) All parts coming into contact with the sterilized stoppers are subject to quick and convenient dismantling by unskilled help for purposes of periodic sterilization.

(7) The machine can be conditioned for operation with bottles having different diameters by the mere turning of a conveniently-disposed handwheel.

(8) The machine can be conditioned for operation with bottles having different heights by the mere turning of another, conveniently-located hand wheel.

(9) The operation of the machine is not adversely affected by normal variations in the size of bottles of the class for which the machine has been set.

These features result in a unitary, compact and highly practical machine for automatically applying stoppers of the stem and flange type into relatively small bottles at a rate in excess of 300 bottles per minute and with complete operating reliability. So far as I am aware, the machine operating speed and its accompanying reliability factor exceed by far anything heretofore proposed.

Having now described my invention in detail in accordance with the patent statutes, various changes and modifications will suggest themselves to those skilled in this art and it is intended that changes and modifications of this character shall fall within the scope of the invention as recited in the following claims.

I claim:

1. A machine for automatically applying stoppers of the stem and flange type to bottles said machine comprising a chute terminating in a substantially vertical section loosely accommodating a plurality of aligned stoppers with their axes substantially horizontal, a rotary hopper, means for feeding a succession of uni-directionally oriented stoppers from the hopper to the chute, means cooperating with the chute for temporarily retaining the lowermost stopper in the chute with the stopper flange projecting from the end of the chute and in a substantially vertical plane, means for feeding a succession of bottles under the chute each into engagement with the exposed flange of the lowermost stopper thereby to dislodge such stopper from the chute on to the bottle with part of the stem of the stopper positioned in the neck of the bottle, and power-driven rotating means positioned immediately following the chute for engaging the upper surface of the thus-positioned stopper and rotatively pressing the stopper stem completely into the neck of the bottle, said rotating means being driven independently of the means for feeding the bottles.

2. A machine for automatically applying stoppers of the stem and flange type to bottles, said machine comprising a cylindrical, rotary hopper accomodating a plurality of stoppers in random orientation; means for expelling from the hopper stoppers having a preselected uniform orientation; means directing the expelled stoppers into a storage area; a chute communicating with the storage area and having an end disposed in a substantially vertical position, said chute loosely accommodating a succession of stoppers with their axes substantially horizontal; means for vibrating the chute; holding means external of the chute end including an end spaced longitudinally of the chute end, said means temporarily retaining the lowermost stopper in the chute with a portion of the stopper flange projecting beyond the chute end; means for moving a succession of vertically-disposed bottles each into engagement with the exposed flange of the lowermost stopper thereby to dislodge the stopper from the chute with the stopper stem in registry with the open neck of the bottle; power-driven rotating means engaging the upper surface of the dislodged stopper to press the stopper stem into the bottle in a rotary motion; and power-driven feed means for engaging each bottle and applying thereto a positive linear movement in cooperation with the moving means as it passes under the chute end.

3. The invention as recited in claim 2, wherein the means for expelling the stoppers from the hopper includes a circular, flat flange attached to an end of the hopper, a circular plate spaced from the flange and forming an effective closure for this end of the hopper, and headed studs disposed between the said flange and plate and circumferentially spaced along a circle having a diameter exceeding the outside diameter of the hopper, said headed studs being so spaced and so oriented that only those stoppers having their flange in substantially flush contact with the plate can be expelled radially of the hopper in response to centrifugal force.

4. The invention as recited in claim 3, wherein the said studs are adjustably secured in radially-extending slots formed in the said flange.

5. The invention as recited in claim 2, including a partition having an opening therein and dividing the hopper into two chambers, and means carried by the partition for selectively altering the effective size of the opening.

6. The invention as recited in claim 2, wherein the said storage area is formed by a pair of flat plates spaced apart in parallel relation a distance slightly greater than the axial length of the stoppers.

7. The invention as recited in claim 2, wherein the means for moving the succession of bottles comprises conveyor belt and said power-driven feed means comprises a pair of resilient, vertically-disposed, rollers disposed on opposite sides of said belt.

8. The invention as recited in claim 7, in combination with means for adjusting the height of the chute end with respect to the tops of the bottles and means for adjusting the spacing between the said resilient rollers.

9. The invention as recited in claim 2, wherein the exposed end of the chute includes a leading edge and a trailing edge, with respect to the direction of travel of the bottles, and said trailing edge is shorter than the leading edge.

10. An automatic machine for applying stoppers of the stem and flange type to bottles said machine comprising a lower cabinet including a flat top portion, an upper cabinet carried by the lower cabinet and vertically adjustable with respect thereto; a conveyor belt movable over the said flat top portion and adapted for moving a succession of vertically-disposed bottles; a cylindrical, rotatable hopper extending forwardly at an angle from the upper cabinet; a circular, flat flange secured to the inner end of the hopper said flange having an opening corresponding to the outside diameter of the hopper; a circular plate spaced from the flange and closing the proximate end of the hopper; a plurality of headed studs disposed between the said flange and circular plate, said studs being circumferentially spaced on a circle exceeding the outside diameter of the hopper and so oriented that only those stoppers having their flange in substantially flush contact with the circular plate can be expelled radially from the hopper under the influence of centrifugal force when the hopper is rotated; a first flat plate having a surface in registry with that of said circular plate; a second flat plate spaced from said first flat plate to form a storage area for stoppers expelled from the hopper; a chute carried by the upper cabinet and having an end extending into the storage area and a vertically-disposed external end spaced above the tops of the bottles, said chute including a channel for loosely accommodating a row of stoppers received from the storage area; means vibrating the chute; a finger member carried by the upper cabinet and having a flat end spaced longitudinally of the exposed chute end, said member forming a stop supporting the stem of the lowermost stopper in said chute whereby the such stopper is temporarily retained in the chute with a portion of its flange exposed for contact by the lip of a bottle as the latter is moved under the chute end; power-driven feed rollers engaging opposed sides of a bottle and driving same past the chute whereby the bottle will impart a rotary movement to the lowermost stopper thereby dislodging the stopper from the chute on to the bottle with the stopper stem in tilted registry with the open bottle neck; power-driven resilient rollers engaging the upper surface of the dislodged stopper and pressing the stem into the bottle neck in a rotary motion, and means for selectively adjusting the spacing between the power-driven feed rollers.

11. The invention as recited in claim 10, wherein the exposed portion of the chute is removably secured to a mounting block and said mounting block is attached to a rotatable shaft carried by the upper cabinet, and the chute vibrates in a plane normal to the axis of said shaft.

12. In a machine for applying stoppers of the stem and flange type to bottles, a vertically-disposed chute loosely accommodating a plurality of stoppers with their axes horizontal, means spaced longitudinally of the chute end and supporting the stem of the lowermost stopper thereby temporarily retaining such stopper in the chute, with a portion of its flange projecting from the chute and positioned vertically, and means for feeding a succession of vertically-disposed bottles under the chute end and into individual engagement with the lowermost stopper thereby to dislodge the stopper from the chute on to the bottle with part of the stem of the stopper positioned in the neck of the bottle, and power-driven rotating means positioned immediately following the chute for engaging the upper surface of the thus-positioned stopper and rotatively pressing the stopper stem completely into the neck of the bottle, said rotating means being driven independently of the means for feeding the bottles.

13. The invention as recited in claim 12, wherein the chute end has a front edge and a rear edge, said rear edge being shorter than the front edge and terminating along a line extending above the center of the flange of the lowermost stopper in the chute.

14. In a machine for applying stoppers of the stem and flange type to bottles, a cylindrical member; a circular flange plate secured to an end of the member, said flange plate having a circular opening corresponding to the cylindrical member and being disposed normal to the axis of the member; a circular back plate spaced from the flange plate and forming an effective closure for the cylindrical member; removable means securing the plates together; and a plurality of headed studs disposed between the said plates, said studs having their axes parallel to that of the cylindrical member and said studs being spaced circumferentially along a circle exceeding the diameter of the cylindrical member.

15. The invention as recited in claim 14 including a partition having an opening therein, said partition being disposed transversely within the cylindrical member to divide the latter into two chambers, and means carried by the partition and adjustable to alter the effective size of the opening.

16. In a machine for applying stoppers of the stem and flange-type to bottles, a downwardly-extending chute loosely accommodating a plurality of aligned stoppers, means for keeping said chute supplied with aligned stoppers, means cooperating with the chute for temporarily retaining the lowermost stopper in the chute with a portion thereof, including the flange, projecting from the chute, means for feeding a succession of bottles into individual engagement with the exposed flange of the lowermost stopper, whereby the neck of the bottle dislodges such stopper from the chute onto the bottle with part of the stem of the stopper positioned in the neck of the bottle, and power-driven rotating means positioned immediately following the chute for engaging the upper surface of the thus-positioned stopper and rotatively pressing the stopper stem completely into the neck of the bottle, said rotating means being driven independently of the means for feeding the bottles.

17. The invention as recited in claim 16 wherein the rotary means is a roller whose surface speed is about 15–40% slower than the speed of the means feeding the bottles under the chute.

18. The invention as recited in claim 16 wherein the chute is pivoted near its bottom and vibrated about that pivot.

19. The invention as recited in claim 16 wherein the retaining means cooperating with the chute is external to, and independent of, the vibratory chute.

20. The invention as recited in claim 16 wherein the rotating means is a roller driven at such rate that the speed of a surface defined by its radius extended by the thickness of the stopper flange is substantially the same as the linear speed of the bottle-feeding means.

21. The method of applying resilient stoppers of the stem and flange type to bottles, which comprises successively conveying the stoppers to a station, loosely holding a stopper at said station with its axis substantially horizontal, positively conveying the bottles along a substantially horizontal path past said station at a given speed, the bottles being positioned with their openings facing upwards, and the path being in such relation to the station that the upper edge of each bottle successively contacts the flange of a stopper at the station and swings the stopper onto the bottle with the stem of the stopper positioned in registry with the opening of the bottle, and immediately passing the bottle and positioned stopper at the aforementioned given speed under a driven roller to force the stem of the stopper into each bottle.

22. The method defined by claim 21 in which the roller is driven at such rate that the speed of a surface defined by its radius extended by the thickness of the stopper flange is substantially the same as the linear speed of the bottles.

References Cited in the file of this patent

UNITED STATES PATENTS

| | | |
|---|---|---|
| 1,363,824 | Tait | Dec. 28, 1920 |
| 1,955,704 | Bahelka | Apr. 17, 1934 |
| 2,117,041 | Simpson et al. | May 10, 1938 |
| 2,180,836 | Risser | Nov. 21, 1939 |
| 2,304,436 | Bell | Dec. 8, 1942 |
| 2,347,668 | Davies | May 2, 1944 |
| 2,433,549 | Enkur et al. | Dec. 30, 1947 |
| 2,551,476 | Vantlander | May 1, 1951 |
| 2,630,959 | Brown | Mar. 10, 1953 |
| 2,635,800 | Dickinson | Apr. 21, 1953 |

FOREIGN PATENTS

| | | |
|---|---|---|
| 525,201 | Great Britain | Aug. 23, 1940 |